US011430142B2

(12) United States Patent
Woodford

(10) Patent No.: US 11,430,142 B2
(45) Date of Patent: Aug. 30, 2022

(54) PHOTOMETRIC-BASED 3D OBJECT MODELING

(71) Applicant: Snap Inc., Santa Monica, CA (US)

(72) Inventor: Oliver Woodford, Santa Monica, CA (US)

(73) Assignee: Snap Inc., Santa Monica, CA (US)

(*) Notice: Subject to any disclaimer, the term of this patent is extended or adjusted under 35 U.S.C. 154(b) by 205 days.

(21) Appl. No.: 16/861,034

(22) Filed: Apr. 28, 2020

(65) Prior Publication Data
US 2021/0334993 A1 Oct. 28, 2021

(51) Int. Cl.
*G06T 7/55* (2017.01)
*G06T 5/00* (2006.01)
*G06T 5/50* (2006.01)

(52) U.S. Cl.
CPC ............... *G06T 7/55* (2017.01); *G06T 5/006* (2013.01); *G06T 5/50* (2013.01); *G06T 2200/08* (2013.01); *G06T 2207/10028* (2013.01)

(58) Field of Classification Search
CPC .... G06T 7/55; G06T 5/66; G06T 5/50; G06T 2200/08
See application file for complete search history.

(56) References Cited

U.S. PATENT DOCUMENTS

| | | | | |
|---|---|---|---|---|
| 8,311,277 B2* | 11/2012 | Peleg | ...................... | G06F 16/739 382/103 |
| 9,208,608 B2* | 12/2015 | Turetzky | .................. | G06T 17/00 |
| 10,853,960 B2* | 12/2020 | Lee | .......................... | G06T 7/246 |
| 11,107,268 B2* | 8/2021 | Gro e | .................... | H04N 13/243 |
| 11,145,072 B2* | 10/2021 | Faras | ........................ | G06T 7/73 |
| 11,199,414 B2* | 12/2021 | Zhang | ..................... | G06T 7/246 |
| 2014/0210951 A1* | 7/2014 | Cho | .......................... | G06T 7/593 348/49 |

(Continued)

FOREIGN PATENT DOCUMENTS

WO WO-2021222386 A1 11/2021

OTHER PUBLICATIONS

"International Application Serial No. PCT/US2021/029609, International Search Report dated Aug. 18, 2021", 4 pgs.

(Continued)

*Primary Examiner* — Gregory M Desire
(74) *Attorney, Agent, or Firm* — Schwegman Lundberg & Woessner, P.A.

(57) ABSTRACT

Aspects of the present disclosure involve a system and a method for performing operations comprising: accessing a source image depicting a target structure; accessing one or more target images depicting at least a portion of the target structure; computing correspondence between a first set of pixels in the source image of a first portion of the target structure and a second set of pixels in the one or more target images of the first portion of the target structure, the correspondence being computed as a function of camera parameters that vary between the source image and the one or more target images; and generating a three-dimensional (3D) model of the target structure based on the correspondence between the first set of pixels in the source image and the second set of pixels in the one or more target images based on a joint optimization of target structure and camera parameters.

20 Claims, 7 Drawing Sheets

(56) References Cited

U.S. PATENT DOCUMENTS

| | | | |
|---|---|---|---|
| 2015/0243035 A1* | 8/2015 | Narasimha | G06T 7/344 382/154 |
| 2015/0279016 A1* | 10/2015 | Kim | G06T 7/85 382/154 |
| 2020/0074698 A1* | 3/2020 | Schaffer | G06T 7/596 |
| 2020/0226825 A1* | 7/2020 | Bian | G06T 17/00 |

OTHER PUBLICATIONS

"International Application Serial No. PCT/US2021/029609, Written Opinion dated Aug. 18, 2021", 12 pgs.

Gordon, Ariel, "Depth From Videos in the Wild: Unsupervised Monocular Depth Learning From Unknown Cameras", IEEE CVF International Conference on Computer Vision (ICCV), (Oct. 27, 2019), 8976-8985.

Xian-Feng, Han, "Image-based 3D Object Reconstruction: State-of-the-Art and Trends in the Deep Learning Era", Deep Learning-based 3D Object Reconstruction—A Survey, arXiv:1906.06543v3 [cs.CV], (Nov. 1, 2019), 27 pgs.

Yajie, Liao, "Simultaneous Calibration: A Joint Optimization Approach for Multiple Kinect and External Cameras", Sensors, 17(7), 1491, (Jun. 24, 2017), 16 pgs.

\* cited by examiner

PHOTOMETRIC-BASED 3D OBJECT MODELING

TECHNICAL FIELD

The present disclosure relates generally to three-dimensional (3D) geometry reconstruction and, more particularly, to generating a 3D model of an object based on two-dimensional images.

BACKGROUND

Offline reconstruction of 3D geometry from 2D images is a key task in computer vision for applications such as digital asset generation and cultural preservation. Commonly, dense geometry is constructed using complex algorithms, such as multi-view stereo (MVS) algorithms. Taking features present in various 2D images and analyzing such features can resolve the 3D geometry of an object that is depicted in the images.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
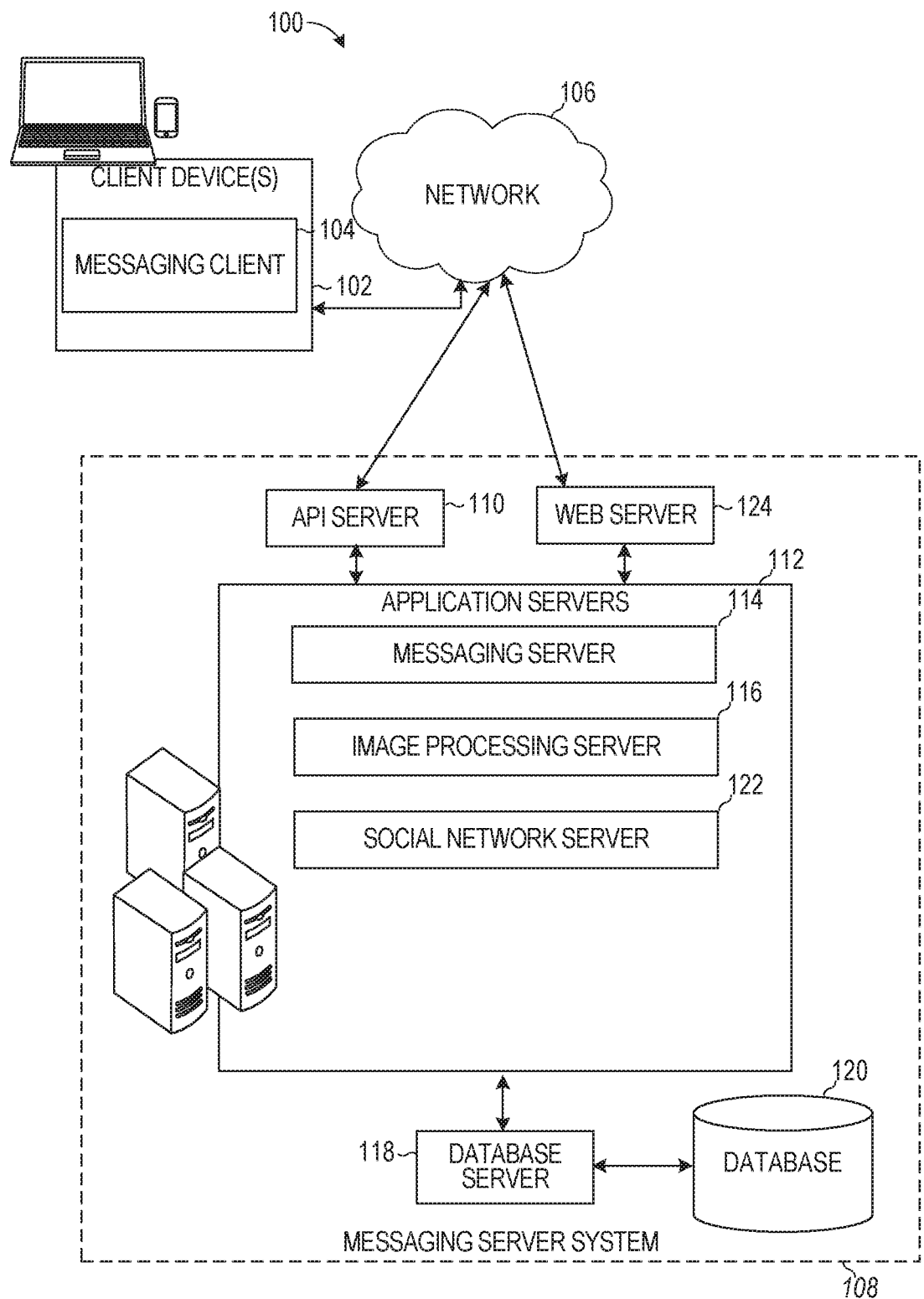
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Many typical approaches are available for reconstructing 3D object geometry from one or more 2D images. Such approaches operate by feature matching or pixel matching structures that are depicted in the images. While such approaches generally work well, their underlying assumptions limit their general applicability across a vast range of images and can result in poor or inaccurate object modeling.

For example, the feature-based SfM (structure from motion) methods and algorithms assume fixed camera parameters and minimizes geometric error between features that are matched between two images. Specifically, such algorithms operate offline and jointly optimize structure and camera parameters. They model scene structure densely with triangulated meshes that are regularized for smoothness. A texture map is inferred using a texture-to-image error and the 3D object geometry is then determined based on the texture map. Inferring a texture map significantly increases the number of variables due to the texture and the dependence between them due to the mesh and smoothness regularization. As a result, optimization is either alternated over different sets of variables (texture, structure and camera parameters) or simple, first-order gradient descent solvers are used. Because of these complexities, such algorithms consume a tremendous amount of system resources, take a long time to achieve a result and have limited applicability, and are not generally suitable for a wide range of applications including real-time image processing. Some MVS methods optimize based on both depth and normal of landmarks though not jointly with camera parameters, which results in relatively inaccurate or incomplete object modeling.

Another image-processing algorithm, known as visual odometry, can be used to generate 3D models of objects depicted in an image. These algorithms minimize an image-to-image error using the structure to compute correspondences between the images. In doing so, these algorithms avoid the complex nature of inferring texture of the objects. Such algorithms model the structure with sparse, ray-based landmarks but assume known and fixed camera parameters (camera intrinsics) to avoid optimizing lens parameters. While this improves the efficiency at which 3D objects are modeled, the applicability of these algorithms is severely limited.

These typical approaches further assume constant brightness of a scene point in all images. This assumption is also severely limiting in applications and results in poor object modeling because lighting conditions change, usually due to time of day or year or shifting of light sources. These lighting conditions may cause objects to look different in different images depending on when, where and how the images were captured.

The disclosed embodiments improve the accuracy and efficacy of using an electronic device by applying a photometric approach to generate a 3D object model based on a variable structure, camera, and lens distortion parameters. The disclosed methods reduce memory requirements for generating 3D object models and are more feasible on larger problems. Specifically, the disclosed embodiments provide an accurate surface model of a 3D object with an efficient optimization problem. The disclosed embodiments jointly optimize both structure parameters and camera parameters and optimize a surface normal per landmark in the joint structure and camera optimization. The disclosed embodiments further optimize lens distortion parameters with image-to-image errors to provide an accurate 3D object model with greater accuracy and less memory requirements than previous algorithms, such as the SfM and MVS methods. In order to generate the 3D object model, the disclosed embodiments define an optimization problem that considers structure, camera, and lens distortion parameters. The optimization problem is solved based on a cost function that relates pixels of a portion of a structure in a source image to pixels in a target image. This significantly improves how objects are modeled in 3D based on 2D images. Particularly, this significantly improves the user experience, reduces the amount of resources needed to accomplish the task of 3D object modeling and increases the overall efficacy and accuracy of the device.

In one example, a 3D coordinate of the portion of the structure is determined by applying an un-distortion parameter(s) or function of a camera used to capture the source image to the pixels of the portion of the structure in the source image. The 3D coordinate is then used to identify corresponding pixels of the portion of the structure in a target image by applying a distortion parameter to a line drawn from the 3D coordinate to a position of the camera used to capture the target image. A normalization is applied to the pixel values to account for different lighting conditions, and a difference is then determined between the normalized pixels in the source and target images. This difference is reduced or minimized to solve the optimization problem to generate the 3D model of the object.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
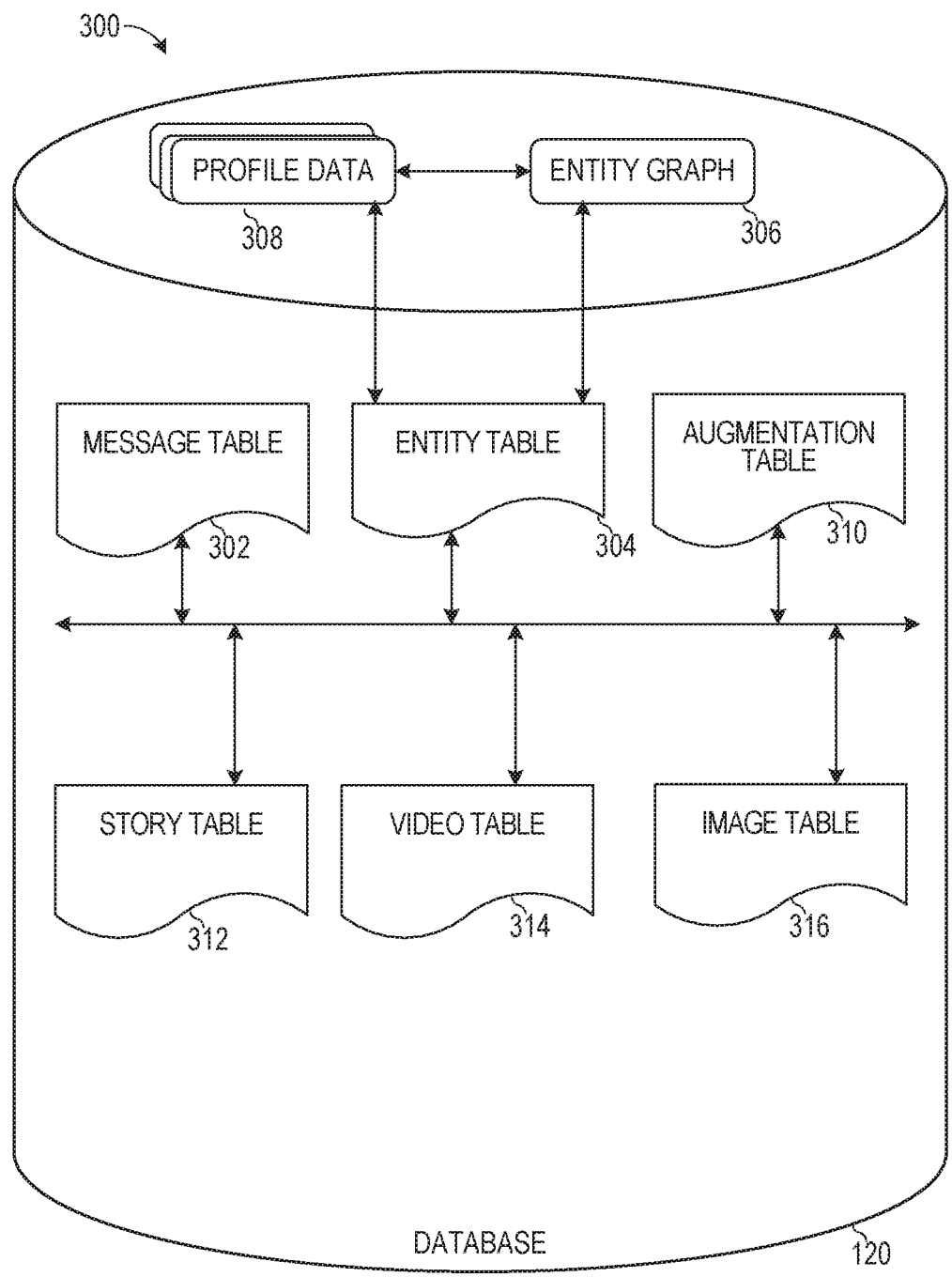
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
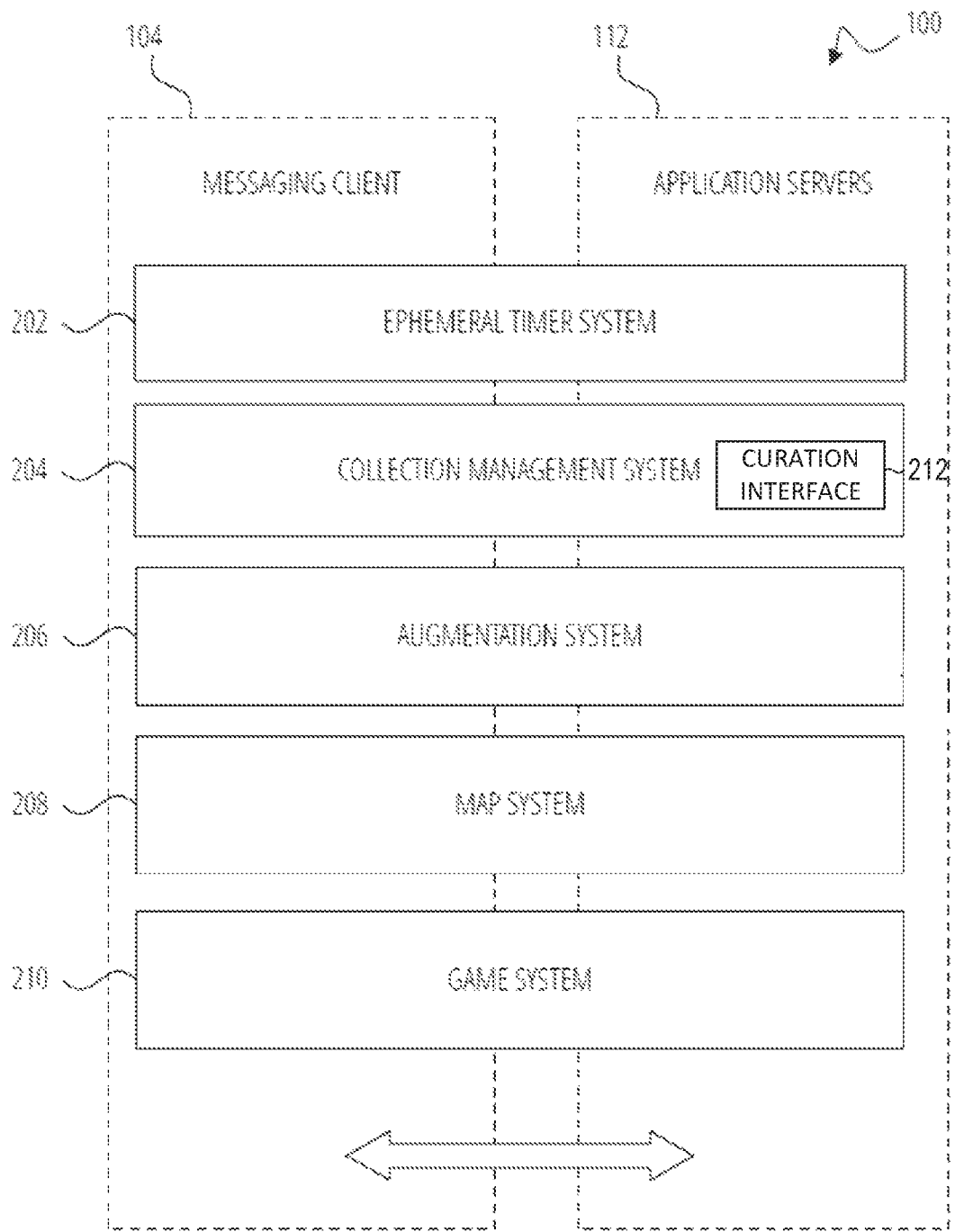
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client side by the messaging client 104 and on the sever side by the application servers 112. These subsystems include, for example, an ephemeral timer system 202, a collection management system 204, an augmentation system 206, a map system 208, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

In other examples, the augmentation system 206 generates a 3D model of one or more structures or landmarks in an image using photometric techniques described below. Specifically, the augmentation system 206 determines correspondence between pixels in a source image and pixels in a target image associated with a portion of a target structure or landmark. The augmentation system 206 solves an optimization problem defined as a function of the determined correspondence to generate the 3D model of the structures or landmarks. In one implementation, the augmentation system 206 performs the 3D model generation in real-time based on a set of frames in a camera feed received from a camera of client device 102. In another implementation, the augmentation system 206 performs the 3D model generation offline based on retrieving a set of images that were previously captured by one or more client devices, such as images stored on the Internet.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any one particular message, at least message sender data, message recipient (or receiver) data, and a payload. Further details regarding information that may be included in a message, and included within the message data stored in the message table 302, is described below with reference to FIG. 4.

An entity table 304 stores entity data, and is linked referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of objects' elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments; any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
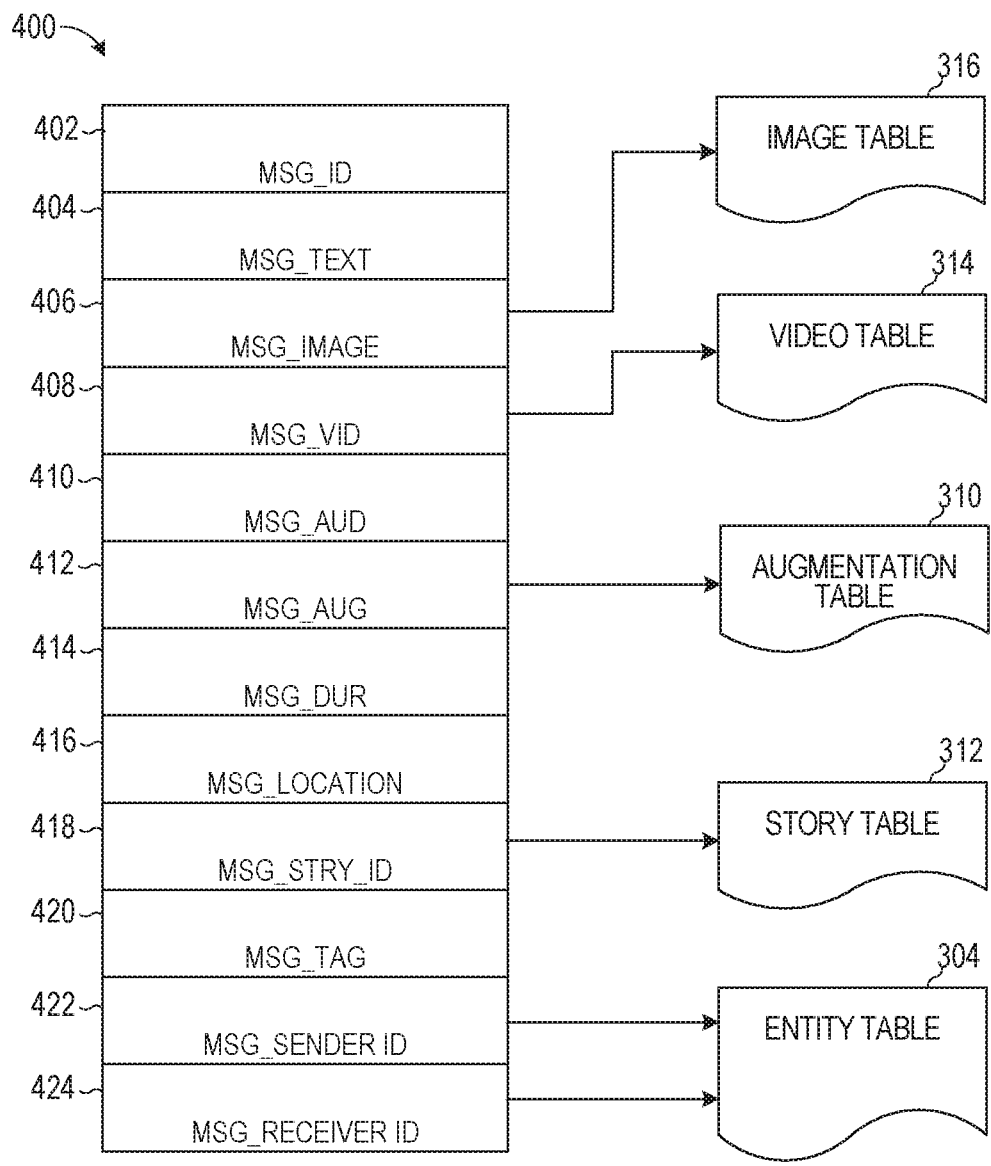
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example; an image value in the message image payload 406 may be a pointer to (or address of) a location within an image table 316. Similarly, values within the message video payload 408 may point to data stored within a video table 314, values stored within the message augmentation data 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5:
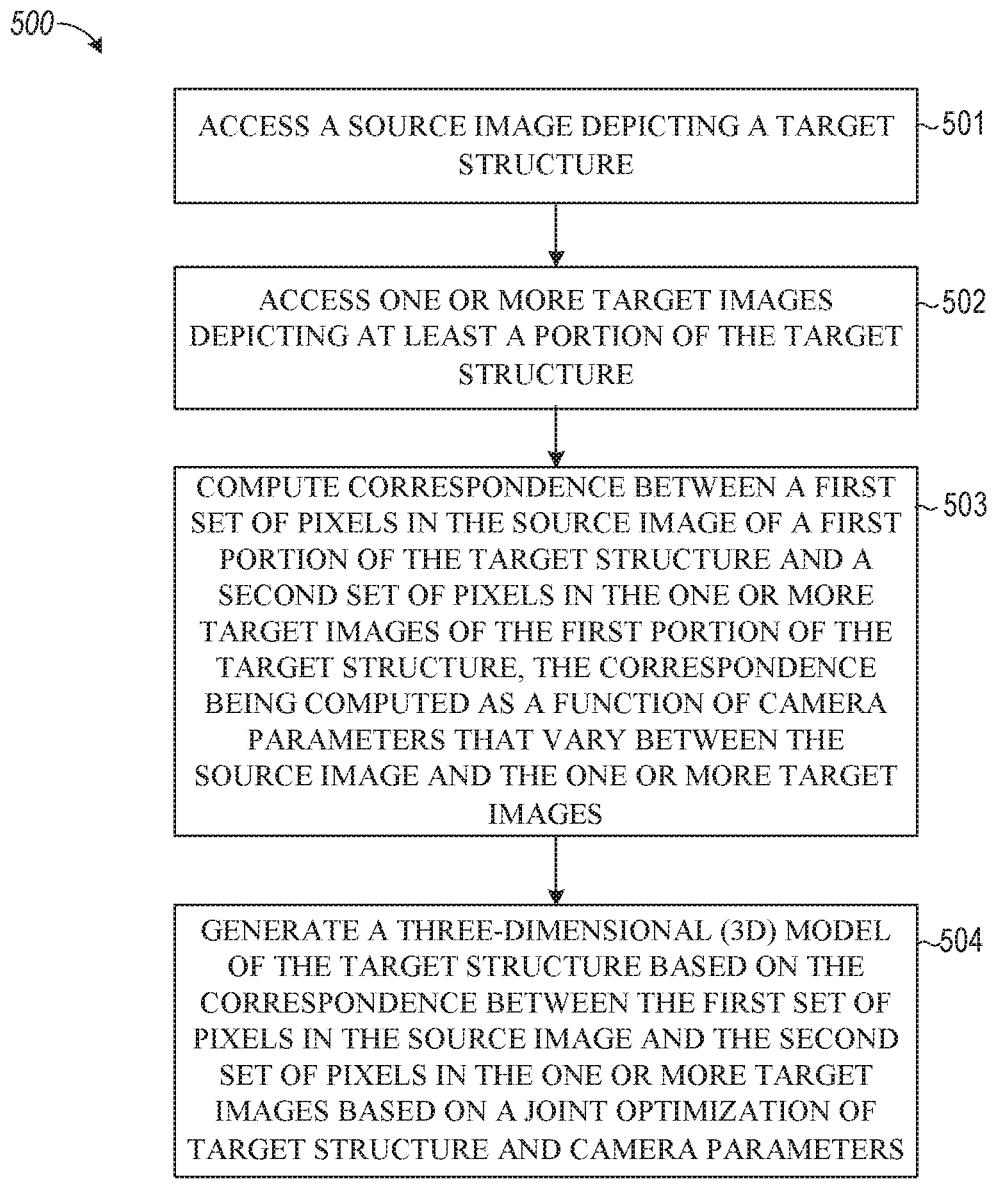
FIG. 5 is a flowchart illustrating example operations of the augmentation system, according to example embodiments.

FIG. 5 is a flowchart illustrating example operations of the augmentation system 206 in performing process 500, according to example embodiments. The process 500 may be embodied in computer-readable instructions for execution by one or more processors such that the operations of the process 500 may be performed in part or in whole by the functional components of the messaging server system 108; accordingly, the process 500 is described below by way of example with reference thereto. However; in other embodiments at least some of the operations of the process 500 may be deployed on various other hardware configurations. The process 500 is therefore not intended to be limited to the messaging server system 108 and can be implemented in whole, or in part, by any other component. The operations in the process 500 can be performed in any order, in parallel, or may be entirely skipped and omitted.

At operation 501, the augmentation system 206 accesses a source image depicting a target structure. For example, the augmentation system 206 receives a live or real-time camera feed from a camera of the client device 102. As another example, the augmentation system 206 retrieves from the Internet or other local or remote source images of a structure or landmark that were previously captured. The augmentation system 206 selects a first of the images that are received that depicts the structure of interest as a source image. In some cases, the augmentation system 206 selects the source image by processing a collection of images and identifying which image has a highest visibility of the structure of interest.

As an example, the augmentation system 206 generates a 3D coordinate frame of the target structure. Namely, the augmentation system 206 selects a region of the structure and generates a set of 3D coordinates (world coordinates) of the region. The augmentation system 206 computes visibility of the 3D coordinates frame for the collection of images as a depth map and selects one of the images in the collection as the source image based on the computed visibility. In some implementations, the augmentation system 206 computes a grid of pixels having specified spacing corresponding to the 3D coordinate frame. For example, the augmentation system 206 projects the 3D coordinate frame to each image in the collection of images to identify the set of pixels in each image that correspond to the 3D coordinate frame. Namely, the augmentation system 206 identifies the pixel coordinates of each image that correspond to the 3D coordinates of the region of the structure. The augmentation system 206 samples the collection of images associated with the grid of pixels to generate a matrix, where each column of the matrix corresponds to a different one of the collection of images. Specifically, the augmentation system 206 obtains the pixel values for the identified pixel coordinates of each image and stores the pixel values in a respective column of a matrix. Then, the augmentation system 206 computes a mean, a weighted mean, or a solution to a robustified sum of squares of the columns of the matrix. The augmentation system 206 compares each column of the matrix to the mean, weighted mean, or the solution to the robustified sum of squares that has been computed and selects, as the source image, an image of the collection of images for which the corresponding column is closest in value to the computed mean, the weighted mean, or the solution to the robustified sum of squares.

In some embodiments, the source frame index is represented by $I_k$ and the visibilities per landmark are represented by $V_k$. These may remain fixed throughout the optimization. A Poisson surface reconstruction is performed on the selected landmarks and the resulting mesh is used to compute visibilities. The mesh is rendered into each view (each image of the collection of images) as a depth map and landmarks are projected into the view. Their depths are compared to the depth map and those that differ by less than 1% are determined to be visible. In order to avoid selecting a source frame that is a photometric outlier (e.g., due to specularity), $I_k$ is chosen as the frame whose patch is closest to the robust mean of the visible, normalized patches. The source frame is selected in accordance with Equation 1 below:

$$I_k = \operatorname*{argmin}_{j \in V_k} \| \bar{I}_j - \mu \|^2, \mu = \operatorname*{argmin}_{\mu \in \mathbb{R}^N} \sum_{j \in V_k} \rho(\| \bar{I}_j - \hat{\mu} \|^2), \bar{I}_j = \quad \text{Equation 1}$$

$$\Psi\Big(|_j \big(v_{s_j}(\varphi_{I_j}(\pi(R_j X_k + t_j)))\big)\Big),$$

where $X_k$ is a 3×N matrix of world coordinates (3D coordinates), a 4×4 grid of points is used, spaced such that the mean spacing in visible views is 1 pixel, on the plane around the $K^{th}$ landmark. μ is computed using iteratively reweighted least squares, starting from the unrobustified mean. To ensure landmarks are only initialized in textured image regions, landmarks are removed for which $\|\bar{I}_{I_k}\|$<0.5N (assuming 256 gray levels). The remaining functions of Equation 1 are described in more detail below. Specifically, $I_j$ defines the projection of the 3D coordinates of the structure onto the pixels in a given image j accounting for camera parameters, lens parameters, and sensor parameters and is described in more detail below. In some cases, to improve convergence of the photometric optimization to a good optimum, the optimization is initially run on half size images first followed by full size images.

At operation 502, the augmentation system 206 accesses one or more target images depicting at least a portion of the target structure. For example, after a given source image is identified, a target image is selected that depicts the same structure (e.g., a different view of the structure). The target image may be an image frame that is subsequently received after the source image in a real-time camera feed. The target frame may be a random frame that is selected from a collection of images that depict a target structure.

In some embodiments, the augmentation system 206 up-samples or down-samples the target image based on differences in the number of pixels that correspond to the portion of the target structure. For example, the source image may have captured the portion of the target structure from a closer distance than the target image. In such cases, the source image will have a greater number of pixels that correspond to the portion of the target structure than the target images. In order to ensure that the same amount of pixels are represented in the source and the target images for the portion of the target structure, the augmentation system 206 up-samples the target image to increase the number of pixels that represent the target structure to match the number of pixels that represent the target structure in the source image. In one embodiment, the augmentation system 206 identifies a first collection of pixels in the source image corresponding to the portion of the target structure and a second collection of pixels in the target image corresponding to the portion of the target structure. The augmentation system 206 may use metadata associated with the images to determine which pixels correspond to which portion of the structure. The augmentation system 206 computes a first distance between each pixel in the first collection of pixels and a second distance between each pixel in the second collection of pixels. The augmentation system 206 selects a sampling parameter based on a difference between the first and second distances. For example, if the first distance is greater than the second distance, the augmentation system 206 selects a value for up-sampling the target image. For example, if the first distance is smaller than the second distance, the augmentation system 206 selects a value for down-sampling the target image. The augmentation system 206 applies the sampling parameter to the target image to up-sample or down-sample the target image.

At operation 503, the augmentation system 206 computes correspondence between a first set of pixels in the source image of a first portion of the target structure and a second set of pixels in the one or more target images of the first portion of the target structure, the correspondence being computed as a function of camera parameters that vary between the source image and the one or more target images. For example, the augmentation system 206 projects a view of a portion of a structure or the entire structure onto the source image, as modeled by Equation 5 below. Namely, the augmentation system 206 draws a ray or line from the camera position and pixels of the portion of the structure in the source image to identify the corresponding 3D world coordinates of the portion of the structure in the source image. In drawing the ray or line, the augmentation system 206 bends the line (e.g., applies an un-distortion parameter of the lens of the camera used to capture the source image— the pixels are un-distorted when they exit the lens of the camera) based on the lens parameters of the camera so that the 3D world coordinates are accurately identified by the view from the camera used to capture the source image. In particular, the augmentation system 206 applies camera, lens and sensor parameters to the pixels in the source image to determine how the light would reach the 3D world coordinates of the structure when viewed by the camera that was used to capture the source image.

Next, using Equation 2 below, the augmentation system 206 draws a ray or line from the 3D world coordinates of the portion of the structure towards the camera that captured the target image to identify the pixels within the target image that represent the 3D world coordinates of the portion of the structure that were identified using the source image. In drawing the ray or line, the augmentation system 206 bends the line (e.g., applies a distortion parameter of the lens of the camera used to capture the target image—the 3D coordinates are distorted by the lens of the camera to generate the pixels of the target image) based on the lens parameters of the camera so that the 3D world coordinates are accurately represented by the view from the camera used to capture the target image. In particular, the augmentation system 206 applies camera, lens and sensor parameters to the 3D world coordinates to determine how the light would reach the 3D world coordinates of the structure when viewed by the camera that was used to capture the target image to identify the pixels in the target image that correspond to the 3D world coordinates of the structure.

A set of camera parameters define the projection of a 3D point, $X \in \mathbb{R}^3$, in world coordinates onto the image plane, in pixel coordinates. A first set of camera parameters includes camera extrinsics which consist of P rotations and translations, $\{R_i, t_i\}_{i=1}^P$, $R_i \in SO(3)$, $t_i \in \mathbb{R}^3$, one pair per image. A second set of camera parameters includes camera intrinsics which consist of C sensor and lens calibration parameters, $\{s_j, L_j\}_{j=1}^C$, $s_j \in \mathbb{R}^4$, $l_j \in \mathbb{R}^2$, one pair per camera, where C<=P. When C is less than P, some camera intrinsics are shared across input images. In such cases, an index mapping from image i to camera j may be required as input. The projection of a 3D structure location to the camera view is defined by Equation 2 below:

$$x' = V_{s_j}(\varphi_{l_j}(\pi(R_j X + t_j))) \quad \text{Equation 2}$$

where $\pi(\cdot): \mathbb{R}^3 \to \mathbb{R}^2$ is the projection function:

$$\pi([x,y,z]^T) = [x/z, y/z]^T, \varphi_l(\cdot): \mathbb{R}^2 \to \mathbb{R}^2$$

is a lens distortion function, and $v_s(\cdot): \mathbb{R}^2 \to \mathbb{R}^2$ is the sensor calibration function defined by Equation 3 below:

$$v_s(x) = \begin{bmatrix} s_1 & 0 \\ 0 & s_2 \end{bmatrix} x + \begin{bmatrix} s_3 \\ s_4 \end{bmatrix}, \quad \text{Equation 3}$$

$$\text{s.t. } v_s^{-1}(x) = \begin{bmatrix} 1/s_1 & 0 \\ 0 & 1/s_2 \end{bmatrix}\left(x - \begin{bmatrix} s_3 \\ s_4 \end{bmatrix}\right)$$

For lens distortion to be applied to identify the pixel coordinates corresponding to 3D structure coordinates (e.g., to identify how the ray is bent by passing light from the 3D coordinates through the lens to generate the target image pixels), a standard polynomial radial distortion model is used, as defined by Equation 4 below:

$$\varphi_I(x) = x(1 + l_1 r + l_2 r^2 + \ldots + l_n r^n) \text{ where } r = \|x\|^2 \quad \text{Equation 4}$$

In some implementations, for world to camera distortion, n=2 and $[I_1, I_2]=I_j$.

To identify the 3D coordinates of a structure based on the source image pixel coordinates (camera to world transformation), the same model can be used with a different set of polynomial coefficients representing the inverse transformation, s.t. $\varphi_I^{-1} \varphi_{\phi(I)}(x)$. Namely, an inverse of Equation 4 can be applied to a source image to determine the un-distortion resulting from passing from the image through the camera lens to map the source image pixel coordinates of the structure of interest to the corresponding 3D coordinates of the structure. The un-distortion coefficients, Ø(I) are computed in closed form using a predetermined set of coefficients of a given lens distortion formula. An example lens distortion formula is discussed in greater detail in Pierre Drap and Julien Lefévre, "An exact formula for calculating inverse radial lens distortions," *Sensors*, 16(6):807, 2016, which is incorporated by reference herein in its entirety.

A ray-based parameterization of structure is used, where each landmark is anchored to a pixel in an input image. Since image texture is being compared around such points, an assumption about the normal of the surface can be avoided and instead the normal of the surface is modeled explicitly. This makes computing the 3D model normal invariant. Each landmark consists of a given (fixed) pixel location x, source frame index i, and the variable surface plane parameterization $n \in \mathbb{R}^3$. In some cases, Martin Habbecke and Leif Kobbelt, "Iterative multi-view plane fitting," *In Int. Fall Workshop of Vision, Modeling, and Visualization*, pages 73-80, 2006, which is incorporated by reference in its entirety, is used to compute the landmark's (structure of interest), 3D or world coordinates according to Equation 5 below:

$$X = R_i^{\top}\left(\frac{\bar{x}}{n^{\top}\bar{x}} - t_i\right), \text{ where } \bar{x} = \begin{bmatrix} \varphi_{I_i}^{-1}(v_{s_i}^{-1}(x)) \\ 1 \end{bmatrix} \quad \text{Equation 5}$$

where X is the world coordinates and x is the pixel coordinates in the image of the structure. A pixel to pixel correspondence x→x' from frame i to j can be achieved by substituting Equation 5 into Equation 2 which can be represented (for N image coordinates) with the function defined by Equation 6 below:

$$\Pi_{ijk}^{\Theta}(\bullet): \mathbb{R}^{2\times N} \to \mathbb{R}^{2\times N}, i,j,k \quad \text{Equation 6}$$

i, j, and k represent the source frame, target frame and the landmark indices respectively and $\Theta = \{\{R_i, t_i\}_{i-1}^P, \{s_j, I_j\}_{j-1}^C, \{n_k\}_{k=1}^L\}$ denotes the set of all problem parameters and the variables to be optimized. L is the number of landmarks. Specifically, $\Theta = \{\{R_i, t_i\}_{i-1}^P, \{s_j, I_j\}_{j-1}^C, \{n_k\}_{k=1}^L\}$ is the optimization problem that is solved to generate the 3D model of the structure.

Each iteration (phase) of optimization of solving the optimization problem computes a parameter update, δΘ. Most parameters, with the exception of rotations, minimally parameterize a Euclidean space and therefore are updated additively (e.g., $n_k \leftarrow n_k + \delta n_k$). For rotations, the update is parameterized (minimally) as $R_i \leftarrow R_i \Omega(\delta r_i)$, where $\Omega(\bullet)$ is the Rodrigues' formula for converting a 3-vector into a rotational matrix. In some cases, a derivative of rotation, $$\frac{\partial}{\partial R}$$

may mean a derivative of the update, $$\frac{\partial}{\partial \delta r}.$$

The update of parameters in general is denoted $\Theta \leftarrow \Theta \oplus \delta \Theta$.

The augmentation system 206 determines or computes a difference between the pixels in the source image and the identified pixels in the target image. Based on this difference, the augmentation system 206 solves an optimization problem that is used to generate the 3D model of the target structure. Namely, the optimization problem is solved based on a cost function that is defined as a difference between the pixels in the source image and the identified pixels in the target image. Specifically, the parameterization provides a mapping from pixels in one image to pixels in another via the scene geometry, and camera positions and intrinsics. The cost measures a difference between the two sets of pixels. To ensure that the cost is invariant to local lighting changes, as well as unexpected occlusions, a robust, locally normalized, least squares NCC cost is used. NCC is discussed in greater detail in commonly, owned U.S. patent application Ser. No. 16/457,607, filed Jun. 28, 2019, which is incorporated by reference in its entirety.

For each landmark (indexed by k), anchored in image $I_i \in \mathbb{R}^{H \times W}$ (in which grayscale images are used), where $i=I_k$ is the source image index of the $k^{th}$ landmark, a 4×4 patch of pixels centered on the landmark is defined. This is referred to as the portion of the structure or landmark. The set of image coordinates is defined by $P_k \in \mathbb{R}^{2 \times N}(N=16)$. This landmark is deemed to be visible in a subset of input frames, the set of indices of which is denoted by $V_k$. The cost over all landmarks and images is defined by Equation 7 below:

$$E(\Theta) = \sum_k \sum_{j \in V_k} \rho(\|\varepsilon_{jk}\|^2), \; \rho(s) = \frac{s}{s+\tau^2} \quad \text{Equation 7}$$

$$\varepsilon_{jk} = \Psi(1_j (\Pi_{ijk}^{\Theta}(P_k)) - \Psi(1_i (P_k)), \; i = I_k,$$

$$\Psi(1) = \frac{1 - \mu_1}{\sigma_1}, \; \mu_1 = \frac{1^{\top} 1}{N}, \; \sigma_1 = \|1 - \mu_1\|,$$

where the notation $I(P) = \tilde{I}$ denotes sampling via bilinear interpolation, and 1 represents a vector of ones. The Geman-McClure kernel ρ robustifies costs with τ=0.5, though any other suitable value or function can be used. Specifically, ρ may be any robustification function that downweighs more extreme measurements. The source frame $I_k$ can be ignored in $V_k$ since it contributes no error by definition. In Equation 7, Ψ defines the function that normalizes the pixels to account for lighting differences making the error or difference computation lighting invariant. Equation 7 accumulates the differences between projections of pixels from a source image to the corresponding pixels in a given set of target images over all of the specified structure portions. Specifically, $P_k$ is the set of pixel coordinates in a source image, i, for a given portion of the structure, k. $\Pi_{ijk}{}^{\Theta}(P_k)$ provides the mapping of the pixel coordinates from the source image to the target image, j. The normalization function $\Psi$ is applied to the set of pixel coordinates in the source image and the corresponding pixel coordinates in the target image and a difference $\varepsilon_{jk}$ is computed. The iteration (phase) continues for each target image in the set of target images and for each structure portion, k, that is identified in the source image. The sum is output as the cost function $E(\Theta)$, which is used to update the parameters of the optimization problem at each iteration. The optimization problem parameters continue to be updated until an error is reduced or minimized to a specified threshold or until a specified number of iterations is completed. At each update, a new sum of the cost function is computed for the same or different set of target images.

At operation 504, the augmentation system 206 generates a three-dimensional (3D) model of the target structure based on the correspondence between the first set of pixels in the source image and the second set of pixels in the one or more target images based on a joint optimization of target structure and camera parameters.

As mentioned above, Equation 7 defines a robustified non-linear least squares cost, for which many optimization problem solvers exist. These solvers generally involve computing the partial derivatives of residual errors with respect to the optimization variables, known as the Jacobian, $J=\partial\varepsilon/\partial\Theta$. Standard implementations of such solvers cache the whole Jacobian, which is infeasibly large, making processing the optimization problem inefficient or requiring a great deal of storage resources. In some larger optimization problems, the Jacobian may not fit at all into the memory, making such problems challenging to solve. According to some embodiments, only one instance of the Jacobian is stored and maintained at each iteration or update, significantly reducing the amount of storage resources and increasing the overall efficiency of the device. Specifically, the disclosed optimization problem has a special structure in common with standard SfM formulations. Without surface regularization, the landmarks are independent of each other. The Variable Projection (Var-Pro) algorithm (discussed below in connection with Algorithm 1) uses the Schur complement to allow the disclosed embodiments to construct and solve a small Reduced Camera System (RCS) problem and then solve for the structure using Embedded Point Iterations (EPIs). This decouples the camera parameter updates from structure parameter updates to reduce the amount of data that is stored. Specifically, the RCS involves the set of all problem variables excluding structure variables, which are denoted as $\overline{\Theta}$. The RCS is constructed and solved using Levenberg-styli damping according to Equation 8 below:

$$\delta\Theta = -(H_{rcs} + \lambda I)^{-1} g_{rcs}, \quad \text{Equation 8}$$

$$H_{rcs} = \sum_{k=1}^{L} \overline{J}_k^T (I - \hat{J}_k \hat{J}_k^+) \overline{J}_k, \quad g_{rcs} = \sum_{k=1}^{L} \overline{J}_k^T (I - \hat{J}_k \hat{J}_k^+) \varepsilon_k,$$

$$\varepsilon_k = [\rho'(\varepsilon_{jk})\varepsilon_{jk}]_{\forall j \in V_k}, \quad \rho'(s) = \frac{\partial}{\partial s}\rho(s) = \frac{\tau^2}{(s+\tau^2)^2}$$

$$\overline{J}_k = \left[\rho'(\varepsilon_{jk})\frac{\partial \varepsilon_{jk}}{\partial \overline{\Theta}}\right]_{\forall j \in V_k}, \quad \hat{J}_k = \left[\rho'(\varepsilon_{jk})\frac{\partial \varepsilon_{jk}}{\partial n_k}\right]_{\forall j \in V_k},$$

where $J^+=(J^TJ)^{-1}J^T$ denotes the matrix pseudo-inverse, and $\lambda$ is the damping parameter. Both $H_{rcs}$ and $g_{rcs}$ can be accumulated one landmark at a time. $H_{rcs}$ is a matrix of dimensions of the number camera parameters (motion of the camera (R and t), camera sensor and focal length, lens parameters) and $g_{rcs}$ is a vector or length of the number of camera parameters. Structure parameters are represented by n. In some cases, a linear system is constructed just in the number of camera parameters by marginalizing out all the structure parameters. The algorithm models how the structure moves if the camera moves.

This enables the disclosed techniques to implement a low-memory computation of the RCS by looping over landmarks and marginalizing them out in the loop. Following the camera parameter update; the EPIs are run until convergence on each landmark independently using a Gauss-Newton update: $\delta n_k = -\hat{J}_k^+ \varepsilon_k$, (Equation 9). Both the summing of the Jacobian parameters into the RCS, and the EPIs, enables the optimization problem solver to operate only on Jacobians of one landmark at a time which avoids the need to store Jacobians associated with more than one landmark at any one time or iteration, thus saving memory resources.

Algorithm 1 below describes the complete optimization according to the disclosed techniques represented in Equation 8. As shown below, the damping parameter in Equation 8 is reduced if the error or cost (S or $E(\Theta)$) in the current iteration (phase) is lower than the error in the previous iteration (phase); otherwise the damping parameter is increased and the optimization problem parameters are set to the prior iteration values. Then, the optimization update is attempted again for all the images and landmarks to determine if the error or cost decreases.

---

Algorithm 1: Low-memory joint optimization using VarPro

---

```
λ ← L; ω ← 10; # Set damping parameters
Compute initial cost, S₀ ← E(Θ₀) , (eq. 7));
for t = 1:10 do
 |   Θₜ ← Θₜ₋₁;
 |   for k = 1:L do
 |   |   Add landmark k to RCS (eq. 8)
 |   Compare cameras update (eq. 8)); Θ̄ₜ ← Θ̄ₜ ⊕ δΘ̄;
 |   for k = 1:L do
 |   |   while cost decreases do
 |   |   |   Compute landmark k update (eq. (9)); nₖₜ ← nₖₜ + δnₖ;
 |   |   Compute new cost, Sₜ ← E(Θₜ), (eq. 7)
 |   |   if Sₜ < Sₜ₋₁ then
 |   |   |   λ ← λ/10; ω ← 10; # Reduce damping
 |   |   else
 |   |   |   Θₜ ← Θₜ₋₁;
 |   |   |   λ ← max(λω, 10⁻⁶); ω ← 2ω; # Increase damping
 |   |   |   go to retry
```

The disclosed embodiments enable a new tool for the 3D reconstruction task for generating a 3D model of a structure using a set of real-time or previously captured images. Refining the structure and camera parameters jointly, using a photometric error that is robust to local lighting variations, provides an improved way to generate the 3D model of the structure. This results in a significant increase in the metric accuracy of reconstruction.

According to the disclosed embodiments, the augmentation system 206 generates a three-dimensional model from the images using NCC least squares optimization in 3D model reconstruction techniques, such as SfM (Structure from Motion, an offline approach that jointly computes camera positions and sparse geometry from a set of images), Multi-view Stereopsis Reconstruction (an offline approach that, given a set of images and their camera positions, generates dense geometry of the scene), SLAM (Simultaneous Localization and Mapping, an online system that jointly computes camera position for each consecutive frame of a video, in real time, as it is captured, as well as a sparse estimate of the scene geometry), and others. In these example embodiments, the augmentation system 206 (operating on the server or on the user device) can implement the NCC least squares scheme with any of the construction methods, and additionally, can use the output of the above methods to track an object. For example, the augmentation system 206 can implement NCC least squares within a SLAM approach to reconstruct an unknown scene/object on a user's mobile device (e.g., client device 102), and the augmentation system 206 can implement the NCC least squares to track the camera position relative to the scene/object.

A building is an example of an image feature that can be uploaded to a database to create a 3D model using the augmentation system 206. For example, assume the building is an average city building and no 3D model exists of the building. Conventionally, creating a 3D model for the building may not be practical as it would require careful measurements and real-world analysis of the building. However, the augmentation system 206 can implement the least squares NCC scheme to correlate points of the building in different user images to generate a 3D reconstructed model of the building. The 3D model data can then be sent to the client device for processing. For example, the 3D model of the building can be overlaid on the building in the images (e.g., in a different user interface layer) and image effects can be applied to the 3D model to create an augmented reality experience. For example, an explosion effect can be applied to the 3D model of the building, or the pixels of the image data can be remapped and enlarged on the 3D model to cause the building to apparently grow in size as viewed through the live video. In some example embodiments, the 3D model data is used for augmented reality effects in addition to being used to identify, track, or align the building in images. For example, a 2D render can be generated from the 3D model of the building, and the 2D render can be compared to frames of the live video to determine that the live video depicts a feature that is similar to or exactly matches the building of the 2D render. One benefit of the least squares NCC approach discussed above is that the augmentation system 206 can efficiently apply the least squares NCC on the client device 102 to generate 3D model data on the client device 102 without server support.

Machine Architecture

Figure 6:
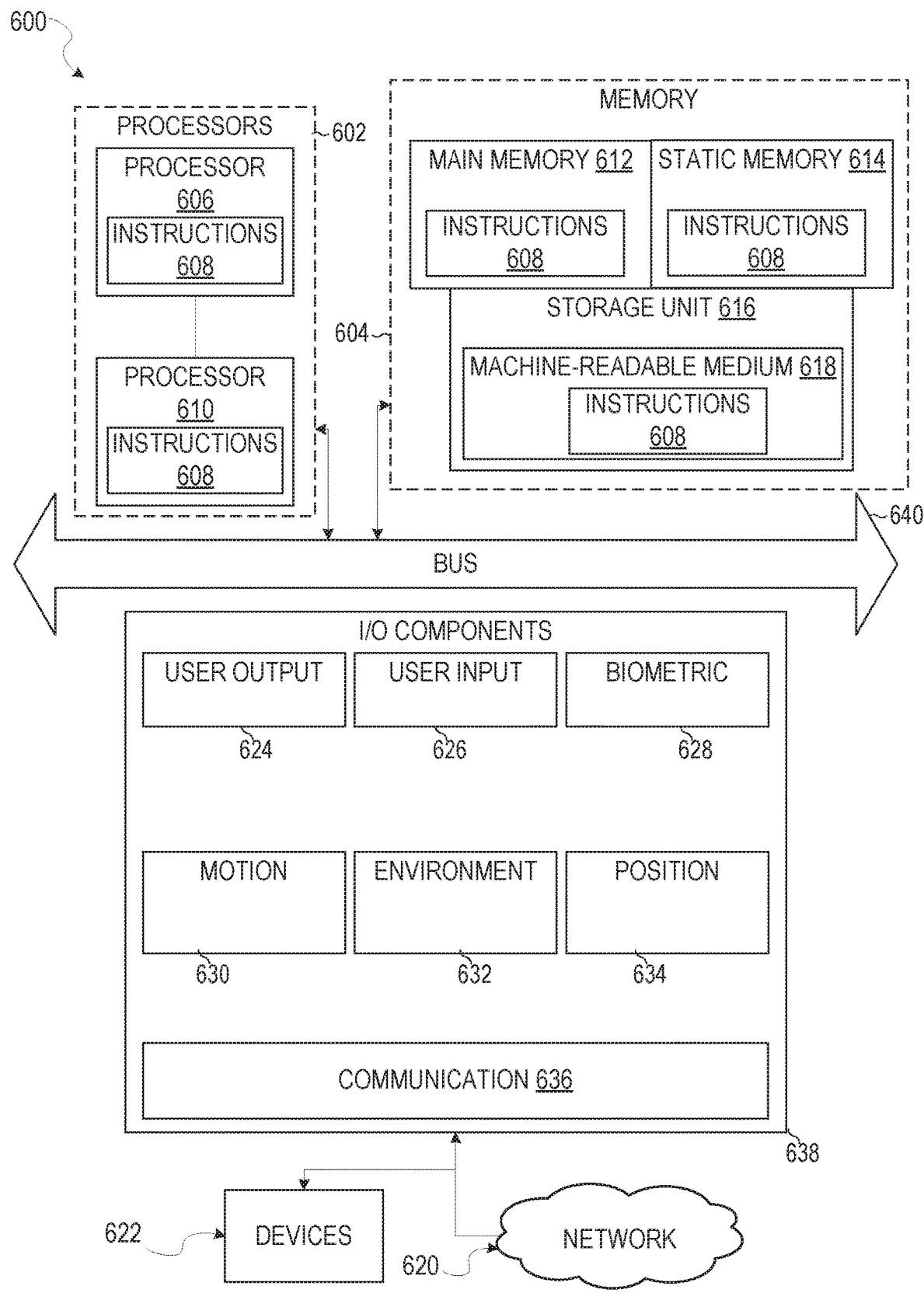
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 602, memory 604, and input/output (I/O) components 638, which may be configured to communicate with each other via a bus 640. In an example, the processors 602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single-core, a single processor with multiple cores (e.g., a multi-core processor), multiple processors with a single core, multiple processors with multiples cores, or any combination thereof.

The memory 604 includes a main memory 612, a static memory 614, and a storage unit 616, all accessible to the processors 602 via the bus 640. The main memory 604, the static memory 614, and the storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602. (e.g., within the processor's cache memory), or any suitable combination thereof, during execution thereof by the machine 600.

The I/O components 638 may include a wide variety of components to receive input, provide output, produce output, transmit information, exchange information, capture measurements, and so on. The specific I/O components 638 that are included in a particular machine will depend on the type of machine. For example, portable machines such as mobile phones may include a touch input device or other such input mechanisms, while a headless server machine will likely not include such a touch input device. It will be appreciated that the I/O components 638 may include many other components that are not shown in FIG. 6. In various examples, the I/O components 638 may include user output components 624 and user input components 626. The user output components 624 may include visual components (e.g., a display such as a plasma display panel (MP), a light-emitting diode (LEI)) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 638 may include biometric components 628, motion components 630, environmental components 632, or position components 634, among a wide array of other components. For example, the biometric components 628 include components to detect expressions (e.g., hand expressions, facial expressions, vocal expressions, body, gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components ((e.g., accelerometer), gravitation sensor components, rotation sensor components gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The components 638 further include communication components 636 operable to couple the machine 600 to a network 620 or devices 622 via respective coupling or connections. For example, the communication components 636 may include a network interface component or another suitable device to interface with the network 620. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data. Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 612, static memory 614, and memory of the processors 602) and storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed examples.

The instructions 608 may be transmitted or received over the network 620, using a transmission medium, via a network interface device (e.g., a network interface component included in the communication components 636) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 622.

Software Architecture

Figure 7:
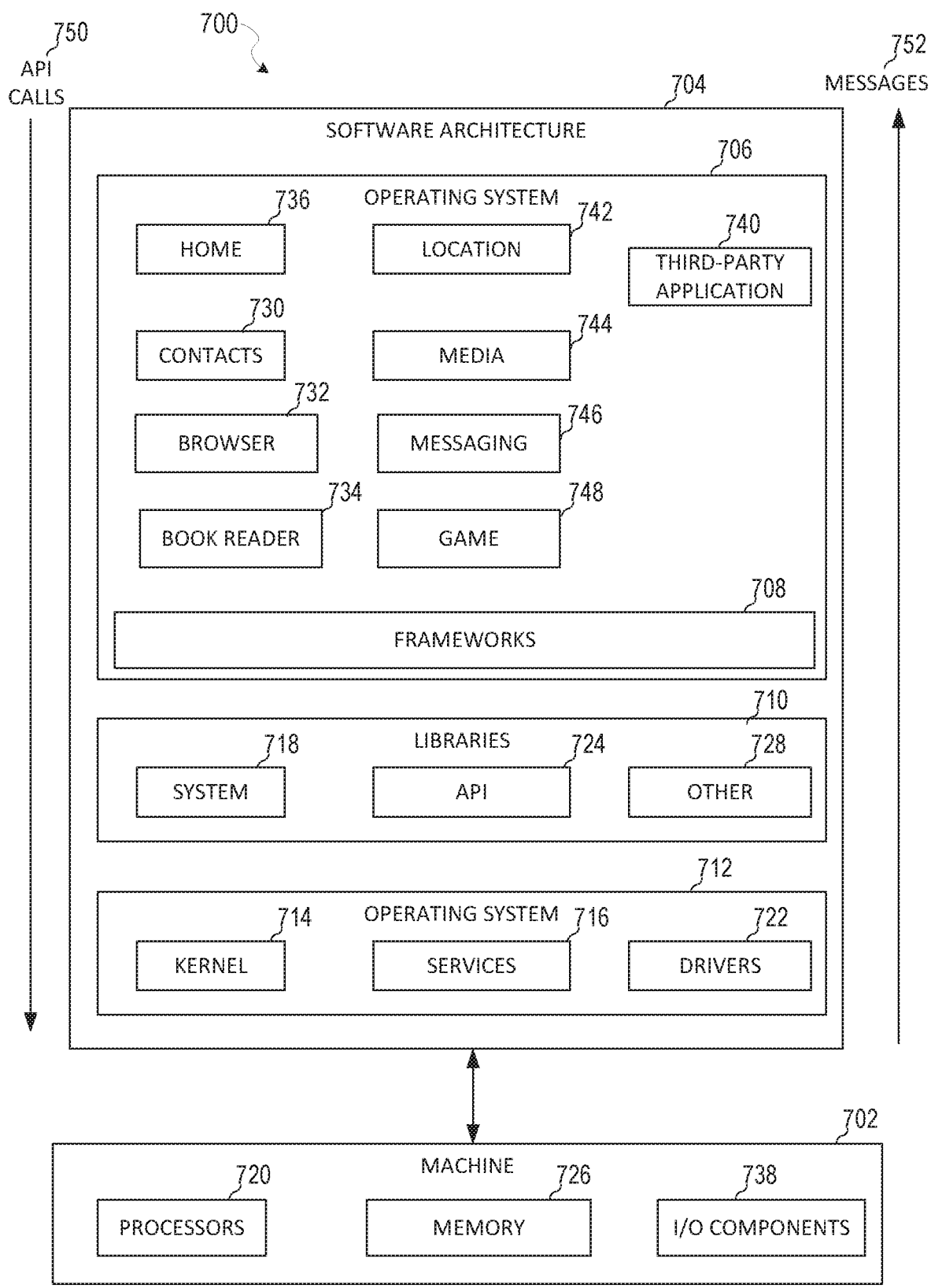
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID' or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 602 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the Like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    accessing a source image depicting a target structure;
    accessing one or more target images depicting at least a portion of the target structure;
    computing correspondence between a first set of pixels in the source image of a first portion of the target structure and a second set of pixels in the one or more target images of the first portion of the target structure, the correspondence being computed as a function of camera parameters that vary between the source image and the one or more target images; and
    generating a three-dimensional (3D) model of the target structure based on the correspondence between the first set of pixels in the source image and the second set of pixels in the one or more target images based on a joint optimization of target structure and camera parameters, the joint optimization comprising solving an optimization problem that is based on a cost function that relates pixels of a portion of a structure in the source image to pixels in a target image.

2. The method of claim 1, wherein the correspondence is further computed as a function of the target structure, and wherein computing the correspondence comprises:
    identifying 3D coordinates of the first portion of the target structure corresponding to the first set of pixels;
    projecting a first line from the first set of pixels to the 3D coordinates by applying a first set of camera parameters associated with the source image;
    projecting a second line from the 3D coordinates to the second set of pixels by applying a second set of camera parameters associated with the one or more target images; and
    computing a difference between each pixel in the first and second sets of pixels.

3. The method of claim 2, further comprising:
    identifying the second set of pixels as a function of the second set of camera parameters and the 3D coordinates; and
    reducing photometric error based on the correspondence to generate the 3D model.

4. The method of claim 2, further comprising:
    un-distorting the first set of pixels based on the first set of camera parameters to project the first line; and
    applying distortion to the second line to project the second line to the second set of pixels.

5. The method of claim 2, further comprising normalizing the first and second sets of pixels.

6. The method of claim 2, further comprising computing a sum of squares of the computed differences.

7. The method of claim 1, further comprising:
    computing a pixel to 3D coordinate correspondence between pixels in the source image and a 3D point on the target structure; and
    computing a 3D coordinate to pixel correspondence between the 3D point on the target structure and a pixel in the one or more target images.

8. The method of claim 1, wherein the camera parameters include rotation, translation, sensor, lens un-distortion, and lens distortion parameters.

9. The method of claim 1, further comprising:
    defining the optimization problem comprising a plurality of structure parameters and the camera parameters, the optimization problem being lighting invariant and surface normal invariant.

10. The method of claim 9, wherein solving the optimization problem comprises decoupling camera parameter updates from structure parameter updates to reduce an amount of data that is stored.

11. The method of claim 1, wherein the source image and the one or more target images are received in real-time in a camera feed from a camera on a client device, further comprising:
    accessing an augmented reality content item comprising an augmented reality effect; and
    overlaying the augmented reality content item onto the camera feed based on the 3D model to provide an augmented reality experience in which the augmented reality content item is displayed as part of the camera feed.

12. The method of claim 1, wherein the source image and the one or more target images are previously captured and processed offline on a server.

13. The method of claim 1, further comprising:
matching a resolution of the source image to a resolution of the one or more target images.

14. The method of claim 13, further comprising:
identifying a first collection of pixels in the source image corresponding to the portion of the target structure;
identifying a second collection of pixels in the one or more target images corresponding to the portion of the target structure;
computing a first distance between each pixel in the first collection of pixels and a second distance between each pixel in the second collection of pixels; and
selecting a sampling parameter based on a difference between the first and second distances.

15. The method of claim 14, further comprising up-sampling or down-sampling the one or more target images based on the sampling parameter.

16. The method of claim 1, wherein accessing the source image comprises:
generating a 3D coordinate frame of the target structure;
computing visibility of the 3D coordinate frame for a plurality of images as a depth map; and
selecting one of the plurality of images as the source image based on the computed visibility.

17. The method of claim 16, further comprising:
computing a grid of pixels having specified spacing corresponding to the 3D coordinate frame;
sampling the plurality of images associated with the grid of pixels to generate a matrix, each column of the matrix corresponding to a different one of the plurality of images;
computing a mean, a weighted mean, or a solution to a robustified sum of squares of the columns of the matrix; and
selecting as the source image an image of the plurality of images for which the corresponding column is closest in value to the computed mean, the weighted mean, or the solution to the robustified sum of squares.

18. The method of claim 1, further comprising:
processing a first set of images that are reduced in size during an initial phase of optimization; and
processing a second set of images as the one or more target images that are full size images following the initial phase of optimization to improve convergence.

19. A system comprising:
a processor configured to perform operations comprising:
accessing a source image depicting a target structure;
accessing one or more target images depicting at least a portion of the target structure;
computing correspondence between a first set of pixels in the source image of a first portion of the target structure and a second set of pixels in the one or more target images of the first portion of the target structure, the correspondence being computed as a function of camera parameters that vary between the source image and the one or more target images; and
generating a three-dimensional (3D) model of the target structure based on the correspondence between the first set of pixels in the source image and the second set of pixels in the one or more target images based on a joint optimization of target structure and camera parameters, the joint optimization comprising solving an optimization problem that is based on a cost function that relates pixels of a portion of a structure in the source image to pixels in a target image.

20. A non-transitory machine-readable storage medium that includes instructions that, when executed by one or more processors of a machine, cause the machine to perform operations comprising:
accessing a source image depicting a target structure;
accessing one or more target images depicting at least a portion of the target structure;
computing correspondence between a first set of pixels in the source image of a first portion of the target structure and a second set of pixels in the one or more target images of the first portion of the target structure, the correspondence being computed as a function of camera parameters that vary between the source image and the one or more target images; and
generating a three-dimensional (3D) model of the target structure based on the correspondence between the first set of pixels in the source image and the second set of pixels in the one or more target images based on a joint optimization of target structure and camera parameters, the joint optimization comprising solving an optimization problem that is based on a cost function that relates pixels of a portion of a structure in the source image to pixels in a target image.

* * * * *